United States Patent
Kondo et al.

(10) Patent No.: US 8,780,250 B2
(45) Date of Patent: Jul. 15, 2014

(54) IMAGE PROCESSING APPARATUS THAT PROCESSES IMAGE DATA TO WHICH A PLURALITY OF PIECES OF CLASSIFICATION INFORMATION ARE ADDED, METHOD OF CONTROLLING IMAGE PROCESSING APPARATUS, AND STORAGE MEDIUM

(75) Inventors: Hiroshi Kondo, Yokohama (JP); Yuichi Nakase, Tokyo (JP); Yousuke Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 13/014,411

(22) Filed: Jan. 26, 2011

(65) Prior Publication Data
US 2011/0187884 A1   Aug. 4, 2011

(30) Foreign Application Priority Data
Feb. 2, 2010   (JP) .................. 2010-021510

(51) Int. Cl.
*H04N 5/222*   (2006.01)
*H04N 5/235*   (2006.01)
*H04N 5/228*   (2006.01)

(52) U.S. Cl.
CPC .................... *H04N 5/228* (2013.01)
USPC .................................... 348/333.01

(58) Field of Classification Search
CPC ............................... H04N 5/23293
USPC ......... 348/231.5, 231.3, 231.6, 231.1, 231.2, 348/333.01–333.05; 715/731, 730
See application file for complete search history.

(56) References Cited

U.S. PATENT DOCUMENTS

| 8,180,690 | B2 * | 5/2012 | Mayle et al. ............. 705/27.1 |
| 8,275,247 | B2 * | 9/2012 | Park ........................ 386/344 |
| 2004/0236807 | A1 * | 11/2004 | Hsiung et al. ............ 708/200 |
| 2005/0117032 | A1 * | 6/2005 | Ueda et al. ............. 348/231.4 |
| 2005/0146740 | A1 * | 7/2005 | Fukuda .................. 358/1.14 |

(Continued)

FOREIGN PATENT DOCUMENTS

| JP | 11-146317 | 5/1999 |
| JP | 2005-092673 A | 4/2005 |
| JP | 2007-243570 A | 9/2007 |
| JP | 2008-052560 A | 3/2008 |

OTHER PUBLICATIONS

Feb. 25, 2014 Japanese Office Action, that issued in Japanese Patent Application No. 2010-021510.

*Primary Examiner* — Nhan T Tran
*Assistant Examiner* — Chan Nguyen
(74) *Attorney, Agent, or Firm* — Cowan, Liebowitz & Latman, P.C.

(57) ABSTRACT

An image processing apparatus that makes it possible, when executing processing on image data groups classified according to classification information, to perform the processing on an image data item having a plurality of pieces of classification information added thereto, in a user-friendly manner adapted to a type of the processing. A system controller selects an image data group of image data items to which specific classification information is added. The controller designates processing to be executed on the image data group. When a plurality of image data groups are selected, the controller causes the processing designated by said designation unit to be executed on an image data item belonging to a plurality of selected image data groups such that the number of times of execution of the processing on the image data item is made different according to a type of the processing.

8 Claims, 14 Drawing Sheets

(56) References Cited

U.S. PATENT DOCUMENTS

| | | |
|---|---|---|
| 2006/0216016 A1* | 9/2006 | Eun ............................. 396/222 |
| 2007/0242902 A1* | 10/2007 | Kobayashi et al. ........... 382/305 |
| 2007/0300158 A1* | 12/2007 | Kasperkiewicz et al. ..... 715/731 |
| 2008/0235275 A1* | 9/2008 | Tanaka et al. .............. 707/104.1 |
| 2008/0301583 A1* | 12/2008 | Akagi ........................... 715/838 |
| 2009/0112830 A1* | 4/2009 | Denoue et al. .................... 707/4 |
| 2009/0153676 A1* | 6/2009 | Nakase et al. ........... 348/207.99 |
| 2012/0114257 A1* | 5/2012 | Fry et al. ....................... 382/224 |
| 2013/0022275 A1* | 1/2013 | Inoue et al. ................... 382/195 |

\* cited by examiner

FIG.8

| PROCESSING MODE | IMAGE TO BE SCROLLED | SELECTION INHIBITING CONDITIONS |
|---|---|---|
| SLIDE SHOW | ALL IMAGES | · NO CONTENT |
| ERASE | IMAGE NOT HAVING PROTECT ATTRIBUTE | · NO IMAGE HAVING PROTECT ATTRIBUTE<br>· NO CONTENT |
| PROTECT | ALL IMAGES | · NO CONTENT |
| PRINT | STILL IMAGE | · NO STILL IMAGE<br>· NO CONTENT |
| TRANSFER | IMAGE NOT TRANSFERRED YET | · NO IMAGE NOT TRANSFERRED YET<br>· NO CONTENT |

FIG.9

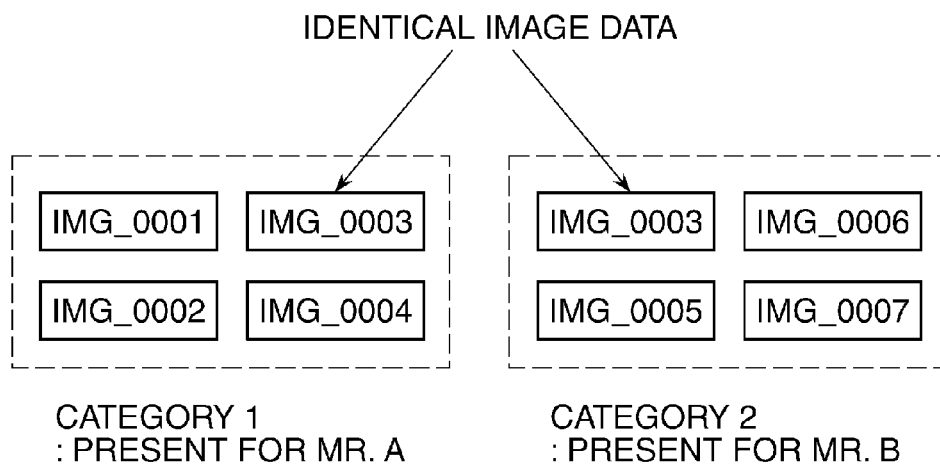

PRINT

☑ CATEGORY 1 (PRESENT FOR MR. A)

☑ CATEGORY 2 (PRESENT FOR MR. B)

☐ CATEGORY 3 (PRESENT FOR MR. C)

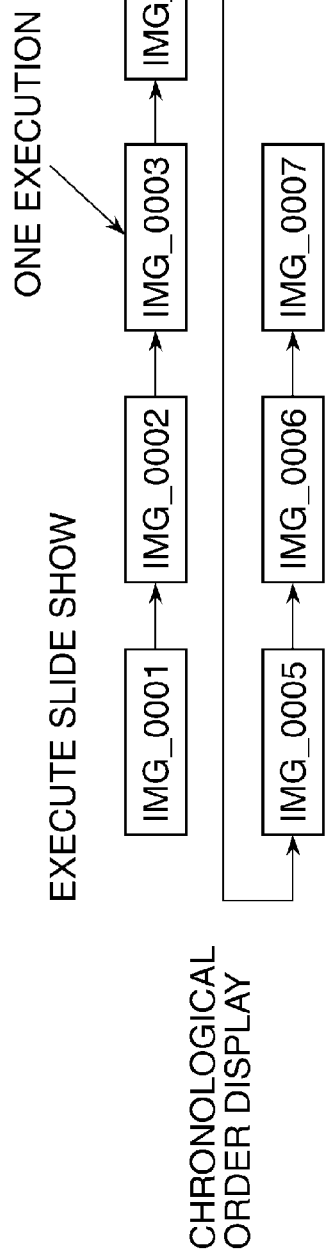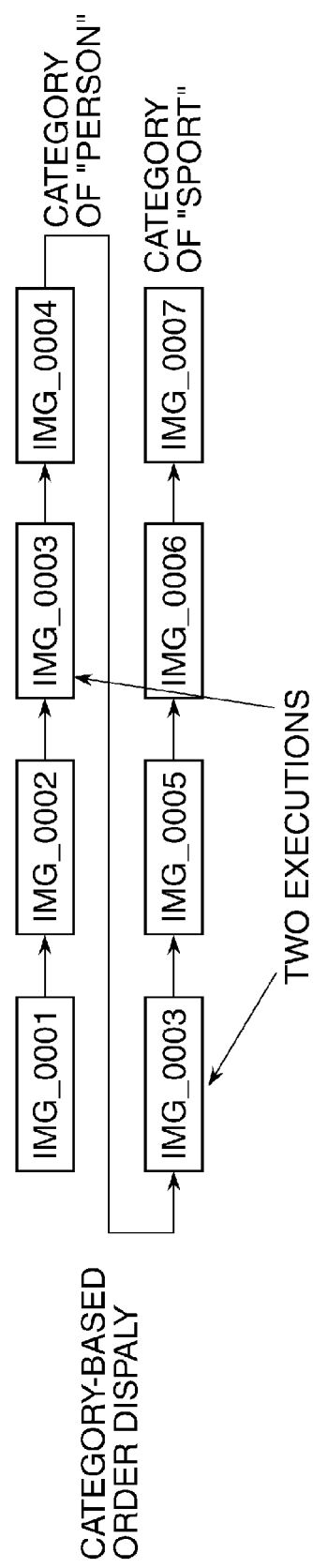

IMAGE PROCESSING APPARATUS THAT PROCESSES IMAGE DATA TO WHICH A PLURALITY OF PIECES OF CLASSIFICATION INFORMATION ARE ADDED, METHOD OF CONTROLLING IMAGE PROCESSING APPARATUS, AND STORAGE MEDIUM

BACKGROUND OF THE INVENTION

1. Field of the Invention

The present invention relates to a technique of processing image data to which a plurality of pieces of classification information are added.

2. Description of the Related Art

A memory card used as a storage medium for digital cameras and the like enables a lot of users to easily carry a large volume of image data, thanks to the increase of capacity and cost reduction thereof. Along with this, there has been increased a demand for sorting and displaying a large volume of image data by a simple operation.

If it is possible to sort and display image data not only by using software operating on a PC, but also by simple operations on a compact display screen using a smaller number of operating members, such as a digital camera, a user can organize image data while the user is away from home, so that it is very useful. Further, if it is possible to select and display only image data to which certain classification information is added from sorted image data, various kinds of usage of a mobile terminal as a viewer can be presented to users, such as the use of presenting a slide show in which only a growth record of a child is shown.

Japanese Patent Laid-Open Publication No. H11-146317 discloses a technique in which a plurality of items of identification information are added to image data, to thereby make it possible to search for image data by searching identification information using AND or OR.

However, although the search of image data has been made possible by the technique, it has been impossible to change details of processing instructed by a user according to a group to which the image data belongs. For example, when image data A belongs to both of a "person" group and a "sport" group, it has been conventionally possible to search the image data A which belongs to both of the "person" group and "sport" group. However, no technique has been disclosed which particularly changes details of processing only on the data A in performing the processing on the respective groups. Therefore, assuming, for example, that the image data contained in the "person" group and the "sport" group is subjected to slide show playback, the image data A which belongs to both the groups is displayed twice, which does not match the user's intention.

SUMMARY OF THE INVENTION

The present invention makes it possible, when executing processing on image data groups classified according to classification information, to perform the processing on an image data item having a plurality of pieces of classification information added thereto, in a user-friendly manner adapted to a type of the processing.

In a first aspect of the present invention, there is provided an image processing apparatus comprising a selection unit configured to select an image data group of image data items to which specific classification information is added, a designation unit configured to designate processing to be executed on the image data group selected by the selection unit, and a control unit configured to be operable when a plurality of image data groups are selected by the selection unit, to control execution of the processing designated by the designation unit on an image data item belonging to at least a plurality of image data groups of the plurality of image data groups selected by the selection unit, such that the number of times of execution of the processing on the image data item is made different according to a type of the processing.

In a second aspect of the present invention, there is provided a method of controlling an image processing apparatus, comprising selecting an image data group of image data items to which specific classification information is added, designating processing to be executed on the image data group selected by the selecting, and controlling, when a plurality of image data groups are selected by the selecting, execution of the processing designated by the designating on an image data item belonging to at least a plurality of image data groups of the plurality of image data groups selected by the selecting, such that the number of times of execution of the processing on the image data item is made different according to a type of the processing.

In a third aspect of the present invention, there is provided a non-transitory computer-readable storage medium storing a computer-executable program for causing a computer to execute a method of controlling an image processing apparatus, wherein the method comprises selecting an image data group of image data items to which specific classification information is added, designating processing to be executed on the image data group selected by the selecting, and controlling, when a plurality of image data groups are selected by the selecting, execution of the processing designated by the designating on an image data item belonging to at least a plurality of image data groups of the plurality of image data groups selected by the selecting, such that the number of times of execution of the processing on the image data item is made different according to a type of the processing.

With the configuration of the present invention, when a type of processing to be performed on image data groups of image data items to which specific classification information is added is selected, and if an image data to which a plurality of pieces of classification information are added is selected more than once as an object to be processed, the processing performed on the image data item is switched according to a type of the processing. Therefore, according to the present invention, when executing the processing on the image data groups classified according to classification information, it is possible to perform the processing on the image data item having a plurality of pieces of classification information added thereto, in a user-friendly manner adapted to a type of the processing.

The features of and advantages of the invention will become more apparent from the following detailed description taken in conjunction with the accompanying drawings.

BRIEF DESCRIPTION OF THE DRAWINGS

FIG. 8 is a diagram showing a table of settings of image data items valid as objects to be processed in each processing mode.

FIG. 9 is a diagram showing an example of pieces of classification information (categories) to be referred to when performing printing.

FIGS. 14A and 14B are diagrams showing how respective slide shows are played when a display order is a chronological order and when the display order is a category-based order.

DETAILED DESCRIPTION OF THE EMBODIMENTS

The present invention will now be described in detail below with reference to the accompanying drawings showing embodiments thereof. The following description of the embodiment will be given of a case where the image processing apparatus according to the present invention is applied to a digital camera which is capable of shooting still images and moving images, by way of example.

Figure 1:
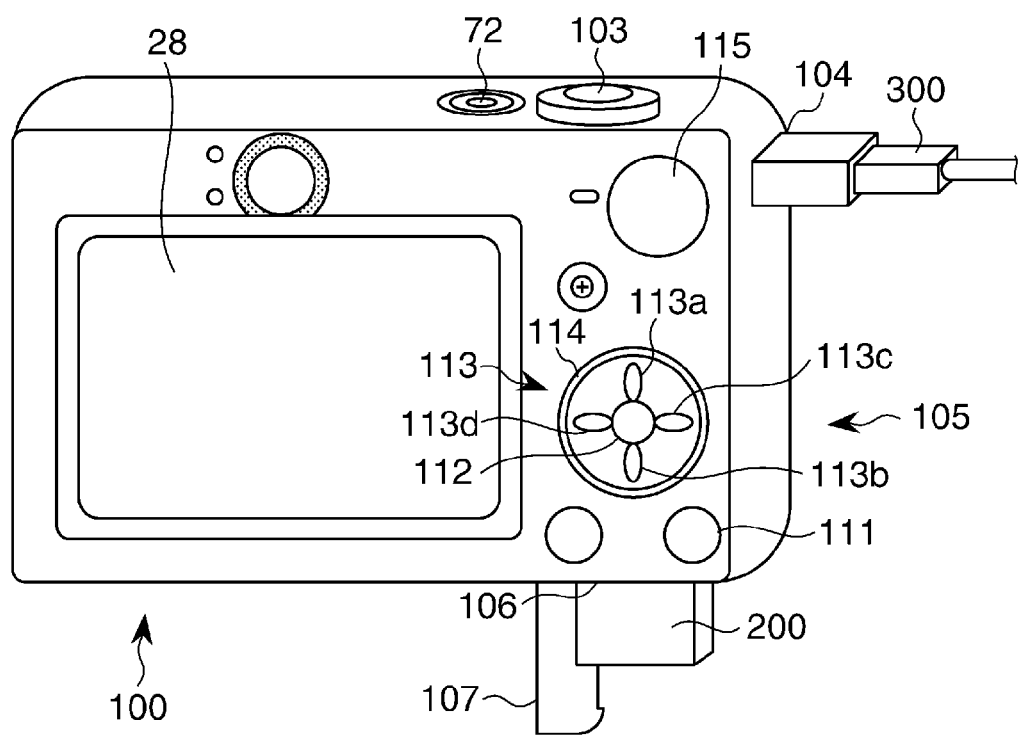
FIG. 1 is a view of the appearance of a digital camera as an image processing apparatus according to an embodiment of the present invention.

FIG. 1 is a view of the appearance of a digital camera 100 as the information processing apparatus according to the embodiment of the present invention. In FIG. 1, reference numeral 28 denotes an image display section that displays image data and various kinds of information, and reference numeral 102 denotes a power switch that switches the power on and off. Reference numeral 103 denotes a shutter button. Reference numeral 300 denotes a connection cable that connects between the digital camera 100 and an external apparatus. Reference numeral 104 denotes a connector that connects between the connection cable 300 and the digital camera 100. Reference numeral 105 denotes a console section that accepts various operations input from a user. The console section 105 comprises the illustrated various buttons, a touch panel provided on a screen of the image display section 28 and like operating members. The various buttons include, for example, a menu button 111, a SET button 112, a four direction-button 113 (an up button 113a, a down button 113b, a left button 113c, and a right button 113d, arranged in a cross), a wheel 114, a mode-switching button 115, an erasure button which is assigned to a predetermined button depending on the operating situation, and so on. The mode-switching button 115 is an operating member for switching between various modes of the digital camera 100. More specifically, it is possible to switch the mode between a still image recording mode, a moving image recording mode, a playback mode, and so on, by operating the mode-switching button 115 to thereby cause operation of a mode-switching switch 60, referred to hereinafter. Reference numeral 200 denotes a recording unit, such as a memory card or a hard disk. Reference numeral 106 denotes a storage medium slot that receives the recording unit 200. The recording unit 200 received in the storage medium slot 106 is allowed to communicate with the digital camera 100. Reference numeral 107 denotes a cover of the storage medium slot 106.

Figure 2:
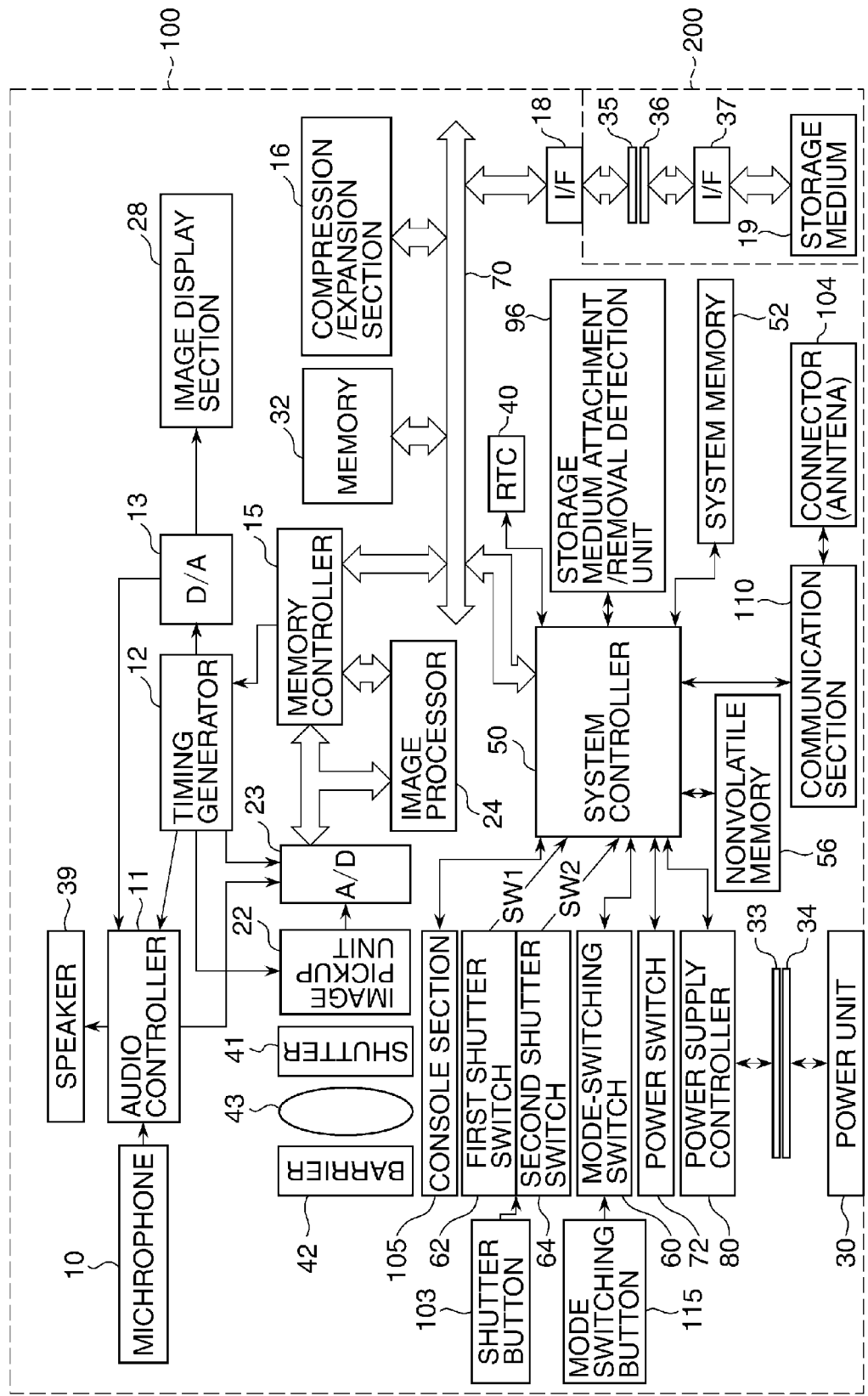
FIG. 2 is a block diagram of the digital camera.

FIG. 2 is a block diagram of the digital camera 100. In FIG. 2, reference numeral 43 denotes a photographic lens and reference numeral 41 denotes a shutter having an aperture-stop down function. Reference numeral 22 denotes an image pickup unit implemented e.g. by a CCD or a CMOS image sensor that convert an optical image into an electric signal. Reference numeral 23 denotes an A/D converter that converts an analog signal into a digital signal. The A/D converter 23 is used for converting an analog signal output from the image pickup unit 22 to a digital signal, and for converting an analog signal output from an audio controller 11 to a digital signal. Reference numeral 42 denotes a barrier that covers the photographic lens 43 and its surrounding to thereby prevent the image pickup system of the digital camera 100, including the photographic lens 43, the shutter 41, and the image pickup unit 22, from being contaminated and damaged.

Reference numeral 12 denotes a timing generator that supplies a clock signal and control signals to the image pickup unit 22, the audio controller 11, the A/D converter 23, and a D/A converter 13. The timing generator 12 is controlled by a memory controller 15 and a system controller 50. Reference numeral 24 denotes an image processor that processes data from the A/D converter 23 or data from the memory controller 15, for predetermined pixel interpolation, resizing, such as size reduction, color conversion, and so forth. Further, the image processor 24 performs predetermined computation processing using picked-up image data, and the system controller 50 performs exposure control and ranging control based on the results of the computation. Through these controls, a TTL (Through The Lens)-method AF (Auto-Focus) processing, AE (Automatic Exposure) processing, and FE (Electronic Flash pre-emission) processing are performed. The image processor 24 further performs predetermined computation processing using picked-up image data, and also performs TTL-method AWB (Automatic White Balance) processing based on the results of the computation.

The data output from the A/D converter 23 is written into a memory 32 via the image processor 24 and the memory controller 15, or directly via the memory controller 15. The memory 32 stores image data obtained by the image pickup unit 22 and converted into digital data by the A/D converter 23, and image data to be displayed on the image display section 28. The memory 32 is also used for storing audio data recorded by a microphone 10, file headers when forming still image data and moving image data. Therefore, the memory 32 has sufficient storage capacity to store a predetermined number of still image data items, and a predetermined playback time length of moving data or audio data.

A compression/expansion section 16 compresses and expands image data by adaptive discrete cosine transform (ADCT) or the like. The compression/expansion section 16 reads out picked-up image data stored in the memory 32 using an operation of the shutter 41 as a trigger to perform compression of the image data, and writes the processed image data into the memory 32. The compression/expansion section 16 further performs expansion processing on compressed image data read from a storage medium 19, referred to hereinafter, of the recording unit 200 into the memory 32, and writes the processed image data into the memory 32. The image data written into the memory 32 by the compression/expansion section 16 is formed into a file by a filing section of the system controller 50, and is recorded in the recording unit 200 via an interface 18. Further, the memory 32 also serves as a memory for image display (video memory). Reference numeral 13 denotes the D/A converter that converts image data stored in the memory 32 for image display, into an analog signal, and supplies the analog signal to the image display section 28. The image display section 28 performs display according to an analog signal from the D/A converter 13, on a display device, such as an LCD. Thus, the image data for display, which is written into the memory 32, is displayed by the image display section 28 via the D/A converter 13.

The microphone 10 outputs an audio signal to supply the same, via the audio controller 11 comprising an amplifier, to the A/D converter 23, where the audio signal is converted into a digital signal, and the memory controller 15 causes the digital signal to be stored as digital data in the memory 32. On the other hand, audio data recorded in the recording unit 200 is read into the memory 32, and then is converted into an analog signal by the D/A converter 13. The audio controller 11 drives a speaker 39 based on the converted analog signal to cause the same to deliver sound.

A nonvolatile memory 56 is an electrically erasable and recordable memory, which is implemented e.g. by a flash ROM. The nonvolatile memory 56 stores constants, programs, etc. for operating the system controller 50. Various processes, described hereinafter, are realized by executing these programs.

The system controller 50 controls the overall operation of the digital camera 100. Further, the system controller 50 executes the programs stored in the above-mentioned nonvolatile memory 56 to realize the processes, described hereinafter. Reference numeral 52 denotes a system memory, and a RAM (Random Access Memory) is used therefor. The constants and variables for operating the system controller 50 and the programs read from the nonvolatile memory 56 are loaded into the system memory 52.

The mode-switching switch 60, a first shutter switch 62, a second shutter switch 64, and the console section 105 form an operation unit for inputting various kinds of operation instructions to the system controller 50. The mode-switching switch 60, which is operated via the mode-switching button 115, is capable of switching the operation mode of the system controller 50 to one of the still image-recording mode, the moving image-recording mode, and the playback mode. The first shutter switch 62 is turned ON when the shutter button 103 appearing in FIG. 1 is operated halfway (pressed halfway) to generate a first shutter signal SW1. The system controller 50 starts the operations of AF (Auto-Focus) processing, AE (Automatic Exposure) processing, and AWB (Automatic White Balance) processing and so on in response to the first shutter signal SW1. The second shutter switch 64 is turned ON when the shutter button 103 is completely operated (fully pressed) to generate a second shutter signal SW2. The system controller 50 starts a sequence of processing operations from reading a signal from the image pickup unit 22 to writing image data into the recording unit 200, in response to the second shutter signal SW2.

Some operating members of the console section 105 act as various function buttons by having functions dependent on the situation assigned thereto through operation of various function icons displayed on the image display section 28 as required. Such function buttons include e.g. an end button, a return button, an image scrolling button, a jump button, a narrowing button, an attribute changing button, and so on. When the menu button 111 appearing in FIG. 1 is depressed, the image display section 28 displays a menu screen from which various kinds of setting can be performed. The user can intuitively perform various kinds of settings using the menu screen displayed on the image display section 28, the four-direction button 113, and the SET button 112. The power switch 72 switches between the power on and off.

Reference numeral 80 denotes a power supply controller comprising a battery detection circuit, a DC-DC converter, and a switch circuit for switching between blocks to be energized (none of which are shown), and detects whether or not a battery is mounted, a type of the battery, and remaining battery charge. The power supply controller 80 further controls the DC-DC converter based on the result of detection and an instruction from the system controller 50, and supplies required voltage to respective sections including the recording unit 200 over as long a time period as required. Reference numeral 30 denotes a power unit that may be implemented by any of a primary battery, such as an alkaline battery or a lithium battery, a secondary battery, such as a NiCd battery, a NiMH battery, or an Li battery, or an AC adapter. Reference numerals 33 and 34 denote connectors that connect between the power unit 30 and the power supply controller 80.

Reference numeral 40 denotes a RTC (Real Time Clock) that counts date and time. The RTC 40 holds a power unit therein separately from the power supply controller 80, and continues time counting even when the power unit 30 is shut down. The system controller 50 sets a system timer using date and time obtained from the RTC 40 when being started, and executes timer control. The interface 18 provides interface between a system bus 70 and the recording unit 200. Reference numeral 35 denotes a connector that connects between the recording unit 200 and the interface 18, and reference numeral 36 denotes a connector that is mounted to the connector 35 for connecting between the recording unit 200 and the digital camera 100. Reference numeral 96 denotes a storage medium attachment/removal detection unit that detects whether or not the recording unit 200, more specifically, the connector 36 is attached to the connector 35. The recording unit 200 comprises the storage medium 19, such as a semiconductor memory or a magnetic disk, an interface 37 with the digital camera 100, and the connector 36 for connecting the recording unit 200 to the digital camera 100. A communication section 110 performs various kinds of communication processing with a device of RS232C, USB, IEEE1394, SCSI, or a like standard, a modem, a LAN, and a wireless communication device, etc. The connector (antenna in the case of wireless communication) 104 connects between the digital camera 100 and the other device via the communication section 110.

The above-described digital camera 100 is capable of shooting using center 1-point AF and face AF. The center 1-point AF is an AF operation performed with respect to one point in the center of a shooting screen. The face AF is an AF operation performed with respect to a human face within the shooting screen, detected by a human face detecting function. Now, a description will be given of the human face detecting function. The system controller 50 transmits image data for human face detection to the image processor 24. The image processor 24 causes a horizontal band-pass filter to act on the image data for human face detection under the control of the system controller 50. Further, the image processor 24 causes a vertical band-pass filter to act on the processed image data under the control of the system controller 50. These horizontal and vertical band-pass filters detect edge components from the image data.

Thereafter, the system controller 50 performs pattern matching with respect to the detected edge components to extract groups of eye candidates, nose candidates, mouth candidates, and ear candidates. Then, the system controller 50 judges that out of the extracted group of eye candidates, each pair which satisfies preset conditions (e.g. a distance between two eyes and tilt of eyes) as an eye pair, and narrows down the eye candidate group to only eye candidates forming such eye pairs. Then, the system controller 50 associates each eye pair of the narrowed-down group of eye candidates with other corresponding candidate face-forming parts (a nose, a mouth, and ears) which are selected from the candidate groups, and further passes the associated face-forming parts through a preset non-face condition filter, to thereby detect a face. The system controller 50 outputs face information detected as a result of the above-described human face detection, and terminates the human face detection process. At this time, data of feature values, such as the number of faces, is stored in the system memory 52.

By carrying out image analysis on the image data displayed for live view or playback, as described above, it is possible to extract feature values of the image data to thereby detect object information. Although in the present embodiment, the face information is mentioned as the object information, by way of example, the object information includes other various kinds of information on results of red-eye detection, eye detection, closed eye detection, smile detection, etc.

It should be noted that it is possible to perform face AE (Automatic Exposure), face FE (Electronic Flash pre-emission), and face WB (White Balance) simultaneously with face AF (Auto-Focus). The face AE is to optimize exposure of the whole screen in accordance with the brightness of a detected face. The face FE is to modulate light of a flash by setting a detected face as the center. The face WB is to optimize WB of the whole screen in accordance with the color of a detected face.

By using the human face detection function, it is possible to attach classification information to header information on image data. The classification information is information on attributes of an image, described in e.g. an Exif (Exchangeable image file format) maker note. It is possible to search images using this classification information as a search key, and manage images by classifying images by classification information. It is assumed that in the present embodiment, it is possible to attach pieces of classification information, such as "person", "event", "scenery", "sport", "category 1", "category 2", and "category 3", as the classification information. The classification information may be automatically attached upon shooting, or can be manually attached by the user, as desired, when reading picked-up image data from the recording unit 200 for playback. A method of automatically attaching classification information upon shooting includes, for example, such a method that when shooting is performed by completely operating (fully pressing) the shutter button 103, if a face is detected by the above-mentioned human face detection function, it is determined that the picked-up image data contains a person, whereby the classification information of "person" is attached. As an alternative, the classification information may be automatically attached according to a scene mode (automatically setting a combination of a shutter speed, an aperture value, a condition of strobe emission, and sensitivity setting, etc. which are suitable for the scene to be shot) set in the digital camera 100 when shooting. A method of manually attaching classification information when playing back (reproducing) an image includes, for example, a method of calling up a classification information-setting screen for setting classification information by operating the console section 105, and setting classification information on the screen.

Figure 3:
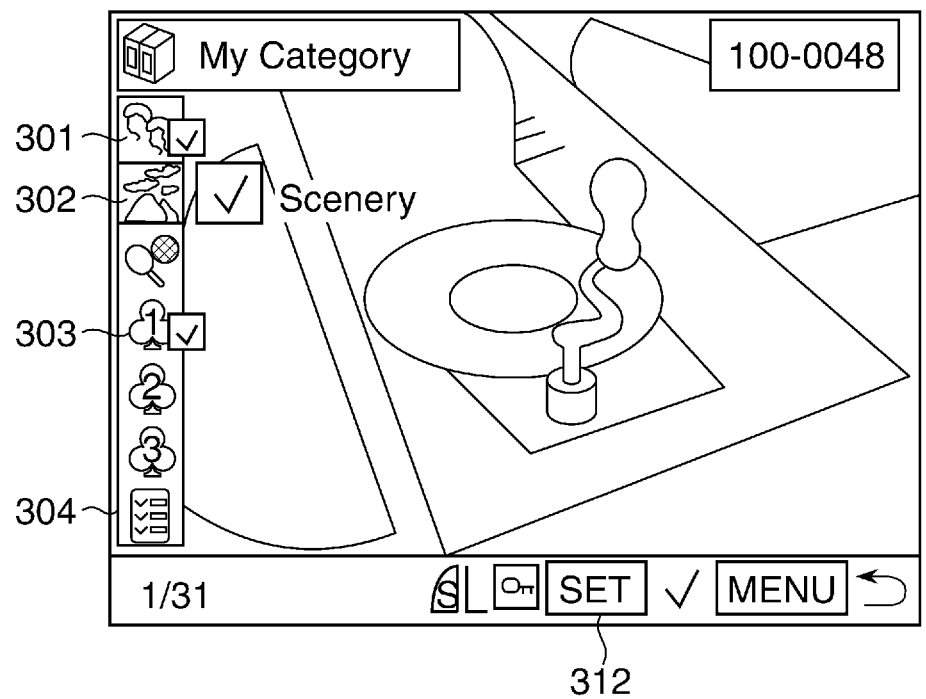
FIG. 3 is a view showing an example of a classification information-setting screen.

FIG. 3 shows an example of the classification information-setting screen. A plurality of icons included in an icon group 304 each represent one piece of classification information. A desired icon is selected from the icon group 304 by the up and down buttons 113a and 113b of the console section 105, and then the SET button 112 of the console section 105 or a SET button 312 displayed on the screen is depressed. Then, if a check mark has not been displayed before depressing the SET button 112 or 312, a check mark is displayed, whereas if a check mark has been displayed before depressing the SET button 112 or 312, the check mark is deleted. A check mark is thus attached or cleared, whereby the classification information represented by the checked icon is attached to the displayed image data. More than one piece of classification information can be attached to one image data item. In the example illustrated in FIG. 3, the icons corresponding to three pieces of classification information, represented by a "person" icon 301, a "scenery" icon 302, and a "category 1" icon 303, are selected, and these pieces of classification information are attached to one image data item.

Figure 4A:
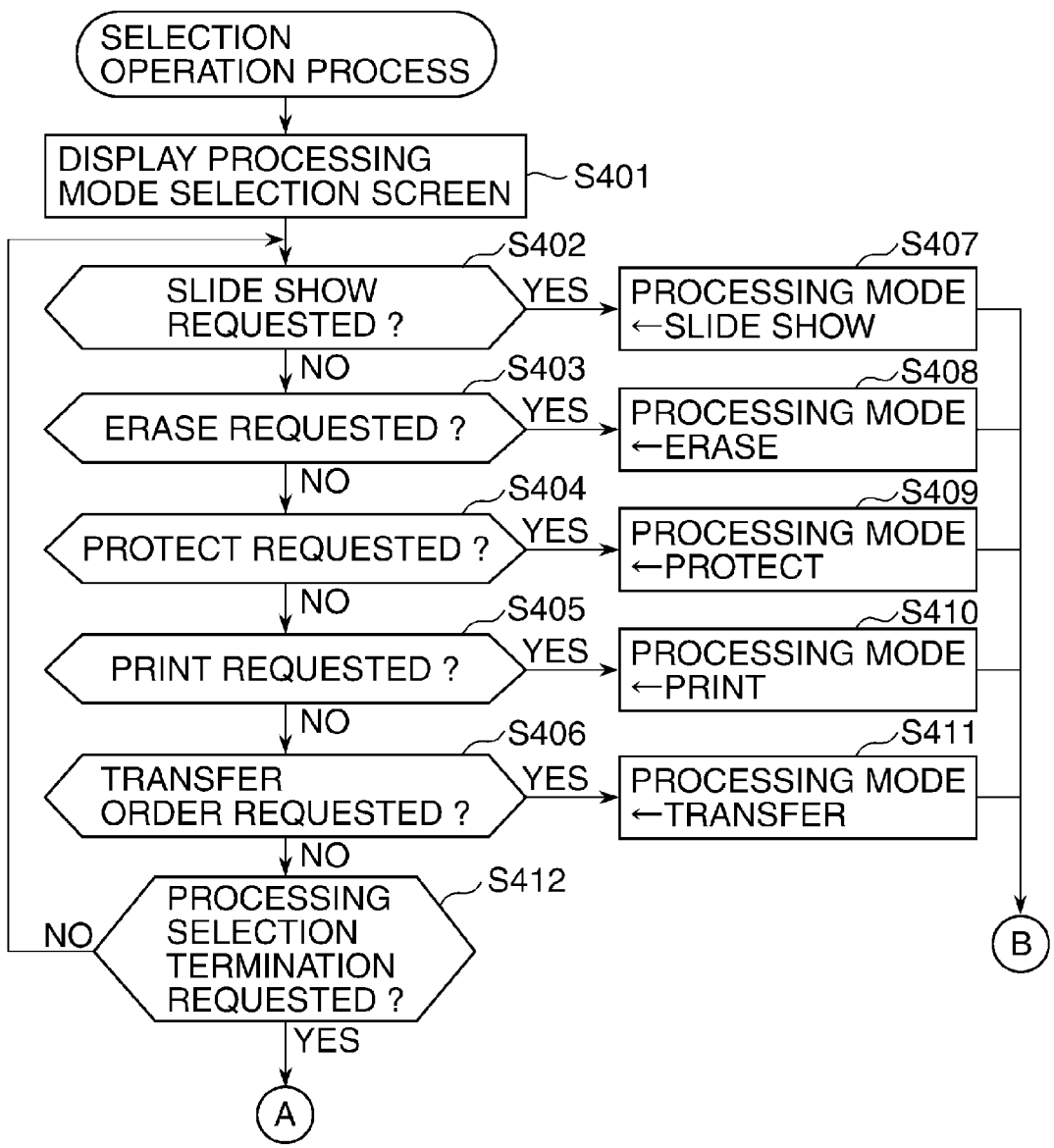
FIGS. 4A and 4B are a flowchart of a selection operation process executed by the digital camera in a playback mode.
Figure 4B:
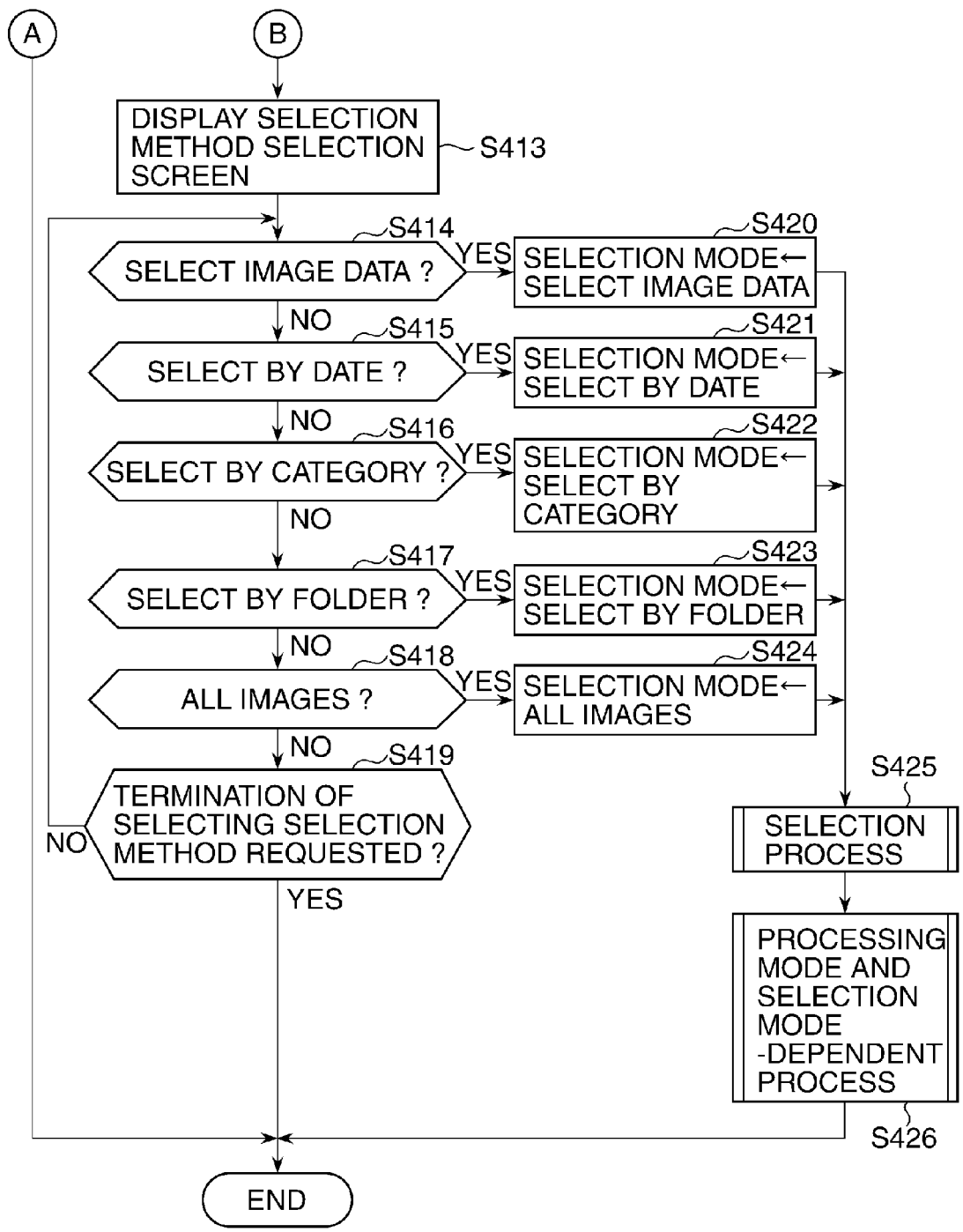

FIGS. 4A and 4B are a flowchart of a selection operation process executed by the digital camera 100 in a playback mode. The selection operation process is executed when it is desired to perform some kind of processing on image data items recorded in the recording unit 200, and for example, can be started by starting the digital camera 100 in the playback mode and operating the console section 105 when performing playback display of image data items.

Figure 5A:
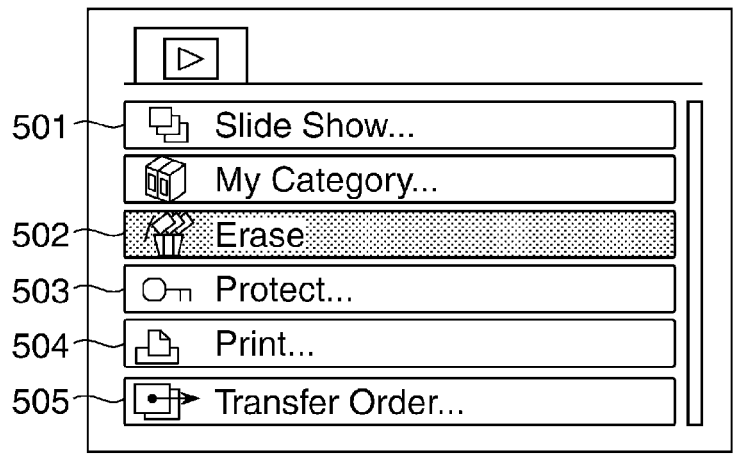
FIGS. 5A to 5C are views showing respective examples of a processing mode selection screen, a selection method selection screen for selecting a method of selecting an object to be processed, and an image data selection screen for selecting an object to be processed when a method of selection by date is selected.

In a step S401, the system controller 50 displays a screen for selecting a processing operation (processing mode selection screen). The processing mode selection screen is a menu screen as shown in FIG. 5A. The user can select a processing operation to be performed on image data via a GUI on this menu screen. The processing operations that can be selected include e.g. "Slide Show" 501, "Erase" 502, "Protect" 503, "Print" 504, and "Transfer Order" 505. In steps S402 to S406, the system controller 50 determines which of the processing operations is selected, "Slide Show", "Erase", "Protect", "Print", or "Transfer Order". That is, the system controller 50 determines whether or not "Slide Show" is requested (step S402). If "Slide Show" is requested, the process proceeds to a step S407, wherein a processing mode of "Slide Show" is set. On the other hand, if "Slide Show" is not requested, the process proceeds to a step S403, wherein the system controller 50 determines whether or not "Erase" is requested. If "Erase" is requested, the process proceeds to a step S408, wherein a processing mode of "Erase" is set. On the other hand, if "Erase" is not requested, the process proceeds to a step S404, wherein the system controller 50 determines whether or not "Protect" is requested. If "Protect" is requested, the process proceeds to a step S409, wherein a processing mode of "Protect" is set. On the other hand, if "Protect" is not requested, the process proceeds to a step S405, wherein the system controller 50 determines whether or not "Print" is requested. If "Print" is requested, the process proceeds to a step S410, wherein a processing mode of "Print" is set. On the other hand, if "Print" is not requested, the process proceeds to the step S406, wherein the system controller 50 determines whether or not "Transfer Order" is requested. If "Transfer Order" is requested, the process proceeds to a step S411, wherein a processing mode of "Transfer Order" is set. On the other hand, if "Transfer Order" is not requested, the process proceeds to a step S412. It should be noted that the processing mode set in one of the steps S407 to S411 ("Slide Show", "Erase", "Protect", "Print", or "Transfer Order") is stored in the system memory 52. If none of the processing operations are selected, in the step S412, the system controller 50 determines whether or not a request for terminating the selection operation is received. If a request for terminating the selection operation is received, the present process is terminated. On the other hand, if a request for terminating the selection operation is not received, the process returns to the step S402.

Figure 5B:
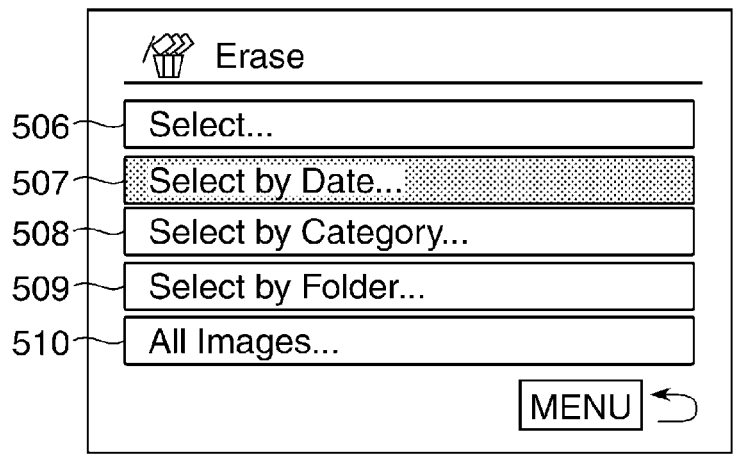

When the processing mode is thus selected, the process proceeds to a step S413. In the step S413, the system controller 50 displays a selection method selection screen for selecting a method of selecting objects to be processed on the image display section 28. This is a display as shown in FIG. 5B, and the user can select a method of selecting objects (image data items) to be processed on this screen. The method of selecting objects to be processed includes, for example, the following:

"Select Image Data" for selecting one or more objects out of all of the image data items (506)

"Select by Date" for collectively selecting objects by date (507)

"Select by Category" for collectively selecting objects by classification information (508)

"Select by Folder" for collectively selecting objects by folder (509)

"All Images" for selecting all of the image data items (510)

In steps S414 to S418, it is determined which of selection methods is selected by the user operating the console section 105, "Select Image Data", "Select by Date", "Select by Category", "Select by Folder", or "All Images". That is, the system controller 50 determines whether or not "Select Image Data" is selected (step S414). If "Select Image Data" is selected, the process proceeds to a step S420, wherein the system controller 50 sets the selection mode to "Select Image Data". On the other hand, if "Select Image Data" is not selected, the process proceeds to a step S415, wherein the system controller 50 determines whether or not "Select by Date" is selected. If "Select by Date" is selected, the process proceeds to a step S421, wherein the system controller 50 sets the selection mode to "Select by Date". On the other hand, if "Select by Date" is not selected, the process proceeds to a step S416, wherein the system controller 50 determines whether or not "Select by Category" is selected. If "Select by Category" is selected, the process proceeds to a step S422, wherein the system controller 50 sets the selection mode to "Select by Category". On the other hand, if "Select by Category" is not selected, the process proceeds to a step S417, wherein the system controller 50 determines whether or not "Select by Folder" is selected. If "Select by Folder" is selected, the process proceeds to a step S423, wherein the system controller 50 sets the selection mode to "Select by Folder". On the other hand, if "Select by Folder" is not selected, the process proceeds to the step S418, wherein the system controller 50 determines whether or not "All Images" is selected. If "All Images" is selected, the process proceeds to a step S424, wherein the system controller 50 sets the selection mode to "All Images". On the other hand, if "All Images" is not selected, the process proceeds to a step S419. The selection mode thus selected in one of the steps S420 to S424 ("Select Image Data", "Select by Date", "Select by Category", "Select by Folder", or "All Images") is stored in the system memory 52. If none of the selection methods are selected, the process proceeds to the step S419, wherein the system controller 50 determines whether or not a request for terminating selection of the selection methods is received. If a request for terminating selection of the selection methods is received, the present process is terminated. On the other hand, if a request for terminating selection of the selection methods is not received, the process returns to the step S414.

When the selections of a processing mode and a selection mode are terminated, the process proceeds to a step S425, wherein the system controller 50 executes a selection process. Details of the selection process will be described hereinafter with reference to FIG. 6. Then, the process proceeds to a step S426, wherein the system controller 50 executes a processing mode and selection mode-dependent process (described hereinafter with reference to FIGS. 7A and 7B), followed by terminating the present process.

Figure 6:
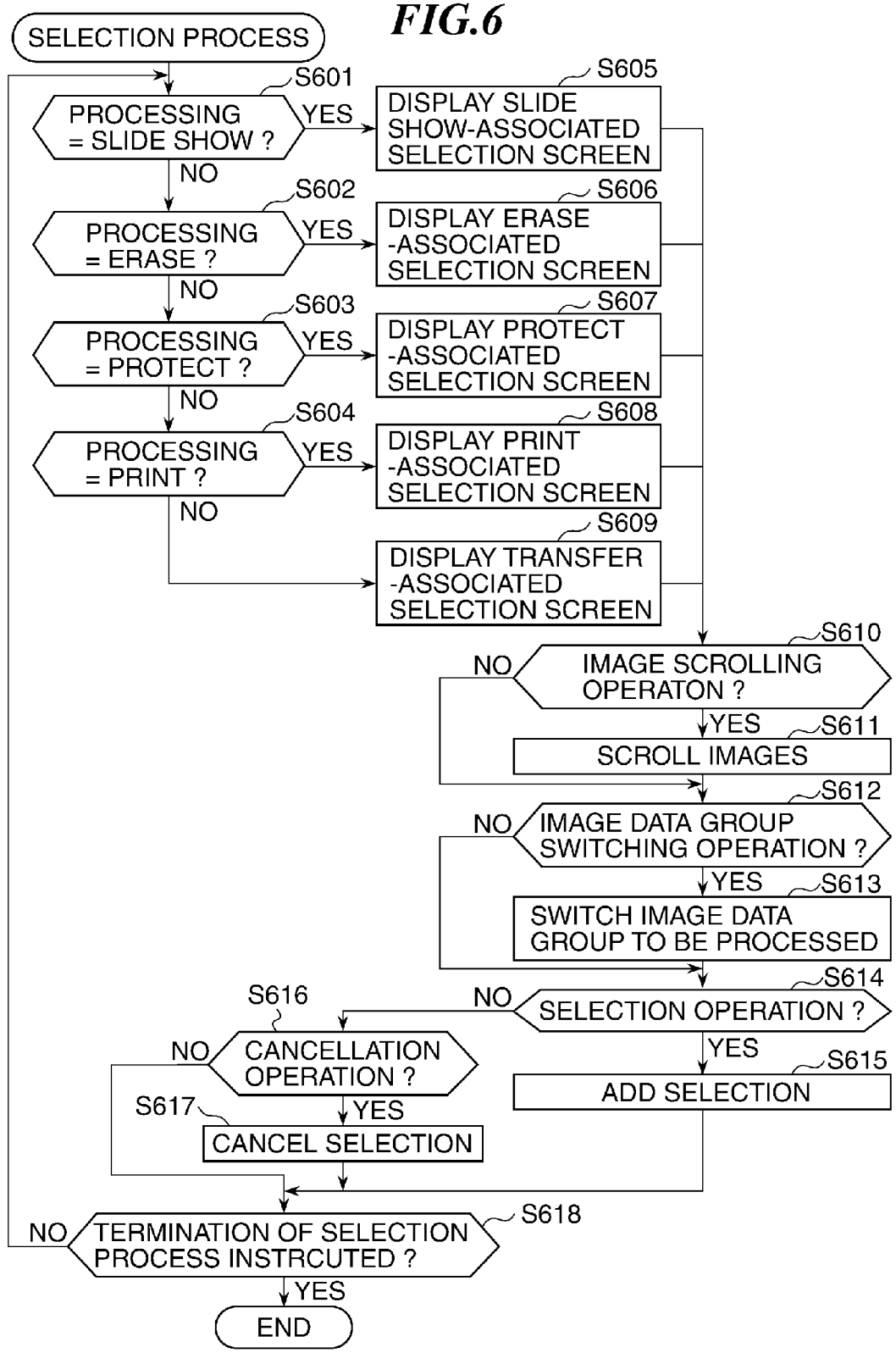
FIG. 6 is a flowchart of a selection process executed in a step in FIG. 4B.

FIG. 6 is a flowchart showing details of the selection process executed in the step S425 in FIG. 4B. When the selection process is started, in steps S601 to S604, the system controller 50 determines the processing mode recorded in the system memory 52. The system memory 52 stores the processing mode selected in one of the steps S407 to S411. That is, in the step S601, the system controller 50 determines whether or not the processing mode recorded in the system memory 52 is "Slide Show". If the processing mode is "Slide Show", the process proceeds to a step S605, wherein the system controller 50 displays an image data selection screen associated with "Slide Show" (slide show-associated selection screen). On the other hand, if the processing mode is not "Slide Show", the process proceeds to a step S602, wherein the system controller 50 determines whether or not the processing mode recorded in the system memory 52 is "Erase". If the processing mode is "Erase", the process proceeds to a step S606, wherein the system controller 50 displays an image data selection screen associated with "Erase" (erasure-associated selection screen). On the other hand, if the processing mode is not "Erase", the process proceeds to a step S603, wherein the system controller 50 determines whether or not the processing mode recorded in the system memory 52 is "Protect". If the processing mode is "Protect", the process proceeds to a step S607, wherein the system controller 50 displays an image data selection screen associated with "Protect" (protection-associated selection screen). On the other hand, if the processing mode is not "Protect", the process proceeds to the step S604, wherein the system controller 50 determines whether or not the processing mode recorded in the system memory 52 is "Print". If the processing mode is "Print", the process proceeds to a step S608, wherein the system controller 50 displays an image data selection screen associated with "Print" (print-associated selection screen). On the other hand, if the processing mode is not "Print", the process proceeds to a step S609, wherein the system controller 50 displays a transfer-associated selection screen.

Figure 5C:
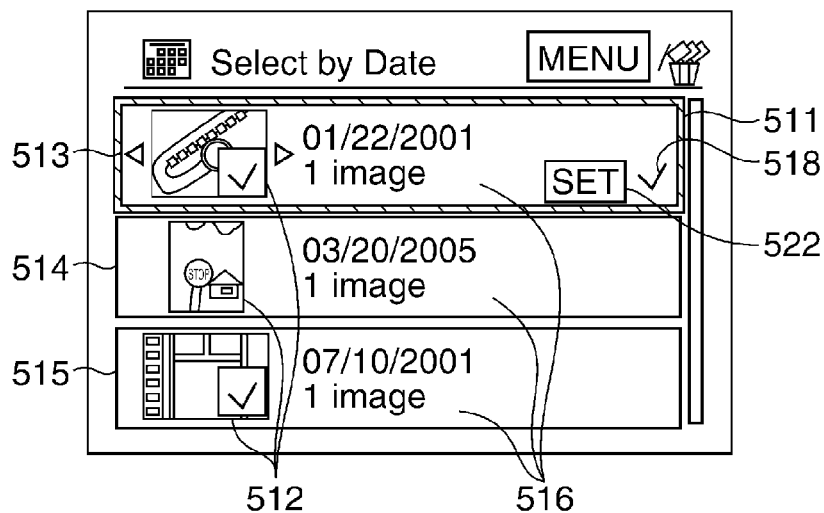

It should be noted that in the present embodiment, one of "Slide Show", "Erase", "Protect", "Print", and "Transfer Order" is selected as the processing mode. Therefore, if all of the answers to the questions of the steps S601 to S604 are negative (NO), it is judged that the processing mode is set to "Transfer Order", so that the transfer-associated selection screen is displayed in the step S609. FIG. 5C is a view showing an example of the image data selection screen associated with a processing mode, which is displayed in the step S425 in FIG. 4B (i.e. in the selection process in FIG. 6), assuming that the processing mode of "Erase" is selected in the step S403 in FIG. 4A and the selection method of "Select by Date" is selected in the step S415 in FIG. 4B. It should be noted that the image data selection screen an example of which is shown in FIG. 5C is displayed in the present process in the following manner: In the selection operation process in FIGS. 4A and 4B, on the FIG. 5A processing mode selection screen displayed in the step S401, a processing mode is selected according to a user's selection operation in the steps S402 to S406, whereby a selection method selection screen associated with the selected processing mode, an example of which is shown in FIG. 5B is displayed. On this selection method selection screen selection screen, a selection method is selected according to a user's selection operation in the steps S414 to S418, whereby the process proceeds to the step S425, i.e. the selection process in FIG. 6. In this selection process, processing in the steps S601 to S609 is automatically executed according to the processing mode recorded in the system memory 52, whereby the image data selection screen an example of which is shown in FIG. 5 is displayed and a user's operation is awaited.

In a step S610, the system controller 50 determines whether or not a user's operation for image scrolling is performed. If the user's operation for image scrolling is performed, the process proceeds to a step S611, wherein the system controller 50 executes image scrolling. In the image scrolling, the system controller 50 scrolls images within an image data display section 512 of an image data group where a cursor 511 is placed. In a step S612, the system controller 50 determines whether or not a user's operation for switching between image data groups is performed. If the user's operation for switching between image data groups is performed, the process proceeds to a step S613, wherein the system controller 50 switches the image data group to be processed to one selected by the user. The image data group to be processed is switched by this operation, so that the cursor 511 is moved. For example, the cursor 511 is moved to the image data group denoted by 513, which indicates that this image data group 513 is an object to be processed. The above-mentioned user's operation for image scrolling is to be performed on the image data group to be processed. Therefore, if the user's operation for image scrolling is performed with the cursor 511 being placed on the image data group 513, image scrolling is performed within the image data group 513, whereby the image data displayed on the image data display section 512 of the image data group 513 is switched. It is assumed that in the present embodiment, for example, the user performs the operation for image scrolling using the left and right buttons 113c and 113d, and the operation for switching between image data groups using the up and down buttons 113a and 113b.

In a step S614, the system controller 50 determines whether or not a user's operation for selecting an image data group is performed. If the user's operation for selecting an image data group is performed, the process proceeds to a step S615, wherein the system controller 50 additionally selects the operated image data group as the object image data in the selected processing mode. On the other hand, if the user's operation for selecting an image data group is not performed, the process proceeds to a step S616, wherein the system controller 50 determines whether or not a user's operation for cancelling selection of the image data group is performed. If the user's operation for cancelling selection of the image data group is performed, the process proceeds to a step S617, wherein the system controller 50 cancels the selection of the operated image data group from the object image data in the selected processing mode.

Now, if one image data item has more than one piece of classification information attached thereto, there is a possibility that the same image data item is selected more than once from more than one image data group. Therefore, when an image data item is selected, the number of times of selection thereof is counted and stored. That is, in the additional selection in the step S615, the number of times of selection of each object image data item is counted up. When the selection of the image data group is cancelled in the step S617, the number of times of selection of each object image data item is counted down.

In a step S618, the system controller 50 determines whether or not a user's instruction for terminating the selection process is received. If a user's instruction for terminating the selection processing is received, the present process is terminated. On the other hand, if a user's instruction for terminating the selection is not received, the process returns to the step S601, from where the above-described process is repeated. Thus, it is possible to select more than one image data group for each processing mode.

FIG. 5C is a view showing an example of image data selection screen for selecting objects to be processed when "Select by Date" is selected out of the above-described selection methods (steps S414 to S418, steps S420 to S424). Reference numerals 513, 514, and 515 denote GUI (Graphical User Interface) displays respectively showing an option of the image data group of Jan. 22, 2001, an option of the image data group of Mar. 20, 2005, and an option of the image data group of Jul. 10, 2004. Reference numeral 516 denotes a display of the number of image data items which belong to the associated date and are valid as objects to be processed. The cursor 511 indicates an image data group being selected. The user can collectively select the image data group by date via the cursor 511 by operating the console section 105. The image data display section 512 displays an image data item of each image data group. Within the image data display section 512 associated with a date where the cursor 511 is placed, it is possible to scroll images of the image data group by input from the console section 105 (steps S610 and S611).

In the present embodiment, by operating the up and down buttons 113a and 113b of the console section 105, the cursor 511 is vertically moved (steps S612 and S613). Then, with respect to the image data group where the cursor 511 is placed, it is possible to scroll images of the image data group within the image data display section 512 by operating the left and right buttons 113c and 113d (steps S610 and S611). This enables the user to select the image data group to be processed while easily confirming the contents of the image data group on the selection display screen. It should be noted that image data items displayed by this image scrolling will be described hereinafter with reference to FIG. 8.

In a state where the cursor 511 is placed on an image data group which is not selected as an object to be processed, by depressing the SET button 112 of the console section 105 or a SET button 522 displayed on the screen by the user, it is possible to select the image data group as one to be processed (steps S614 and S615). Further, if the cursor 511 is placed on the image data group which has been selected as the object to be processed, and then the SET button 112 or the SET button 522 displayed on the screen is depressed, the selected state is cancelled (steps S616 and S617). On the image data group selected as the object to be processed, a check mark 518 indicating the selected state is displayed. Further, it is possible to select a plurality of image data groups as the objects to be processed. It should be noted that also in a case where the other selection method (Select by Category, Select by Folder, and so on) is selected, the selection screen is similar to that shown in FIG. 5C.

FIG. 8 shows a table of settings of image data items valid as objects to be processed in each processing mode. The image data items valid as objects to be processed are also image data items to be scrolled by the user's operation for image scrolling (S610 and S611). Further, the number 516 of image data items valid as objects to be processed is the number of image data items selected as objects to be processed according to the settings of the table shown in FIG. 8.

For example, in the processing mode of "Erase", image data items having the protect attribute are not to be erased, and hence the number of image data items of the image data group, which have the protect attribute, is not included in the number denoted by reference numeral 516. That is, only the number of image data items not having the protect attribute is displayed as denoted by reference numeral 516. By displaying the number of image data items valid as objects to be processed, for the image data group as a selection candidate, the user is capable of grasping, from the selection screen as shown in FIG. 5C, the number of objects to be processed, for accurate selection. It is to be understood that at this time, the number of image data items that are included in the image data group but invalid as objects to be processed, or a total number of image data items included in the image data group may be displayed instead or in combination. Further, a notification to the user that the image data items invalid as objects to be processed are included in the image data group or the like may be displayed. This enables the user to select the image data group after performing more accurate confirmation.

Further, in scrolling images of the image data group in the image data display section 512, only image data items valid as objects to be processed are displayed. According to the settings in the table shown in FIG. 8, the objects to be processed are set to all of image data items in the processing modes of "Slide Show" and "Protect", and hence image scrolling in the image data display section 512 can be performed on all of the image data items of the image data group, and further there is no image data items which cannot be selected. On the other hand, in the processing mode of "Erase", image data items having the protect attribute are not to be erased, and hence image scrolling can be performed on only image data items not having the protect attribute.

Further, in the processing mode of "Erase", when all of image data items included in an image data group where the cursor 511 is placed have the protect attribute, there is no object on which erasure processing is to be executed. Therefore, the user is notified that the image data group cannot be selected. This can be expressed, for example, by setting the GUI display of the image data group to a non-activated (grayed-out) state. In the processing mode of "Print", objects to be printed are set to only still images, and hence image scrolling can be performed on only still image data items. When all of image data items included in an image data group where the cursor 511 is placed is other than image data items of still images, e.g. moving image data items or audio data items, there is no objects on which print processing is to be executed, and hence the user is notified that the image data group cannot be selected similarly to the above. In the processing mode of "Transfer Order", objects to be transferred are set to image data items which have not been transferred, and hence image scrolling can be performed on only image data items which have not been transferred yet. When all of image data items included in an image data group where the cursor 511 is placed are image data items which have already been transferred, there is no objects on which transfer processing is to be executed, and hence the user is notified that the image data group cannot be selected similarly to the above. It should be noted that when an image data group has no contents, there are no objects to be processed in any of processing modes, so that the GUI display of the image data group is set to a non-activated (grayed-out) state.

As described above, by selecting an image data group to be processed after setting the processing mode, the number of image data items valid as objects to be processed is displayed, and whether or not the image data group can be selected and objects on which image scrolling is to be performed are determined according to the processing mode set in advance. This makes it possible to cause the user to properly select objects to be processed without causing the user to select the image data group having no objects to be processed, or displaying image data items which are not objects to be processed.

Now, an image data item to which a plurality of pieces of classification information are added can be redundantly selected when image data groups are collectively selected by the selection operation. In this case, it is sometimes more convenient to change handling of the redundantly selected image data items according to the processing mode. In the present embodiment, in view of this point, the number of execution of processing on the redundantly selected image data item is changed on a processing mode-by-processing mode basis.

Figure 7A:
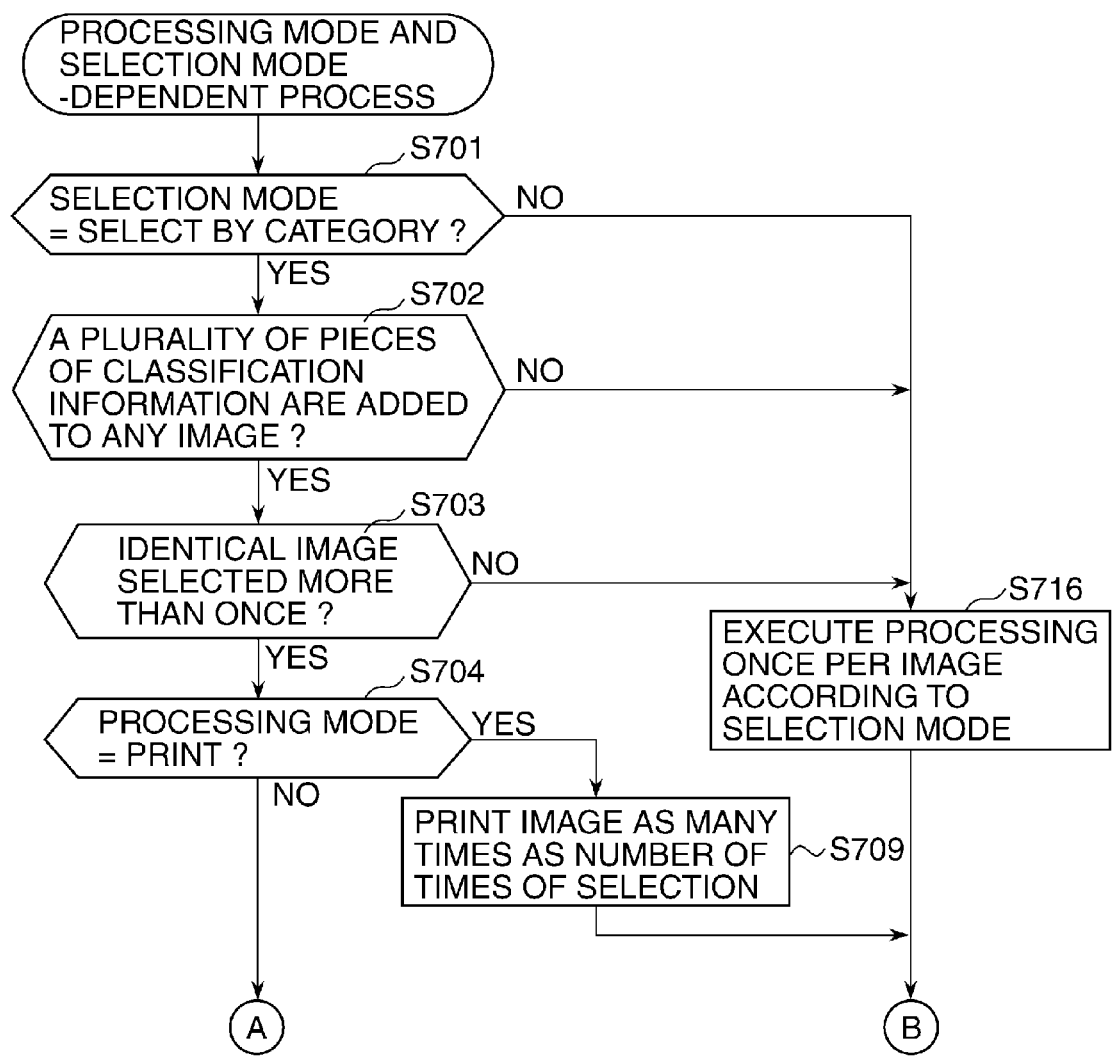
FIGS. 7A and 7B are a flowchart of a processing mode and selection mode-dependent process executed in a step in FIG. 4B.
Figure 7B:
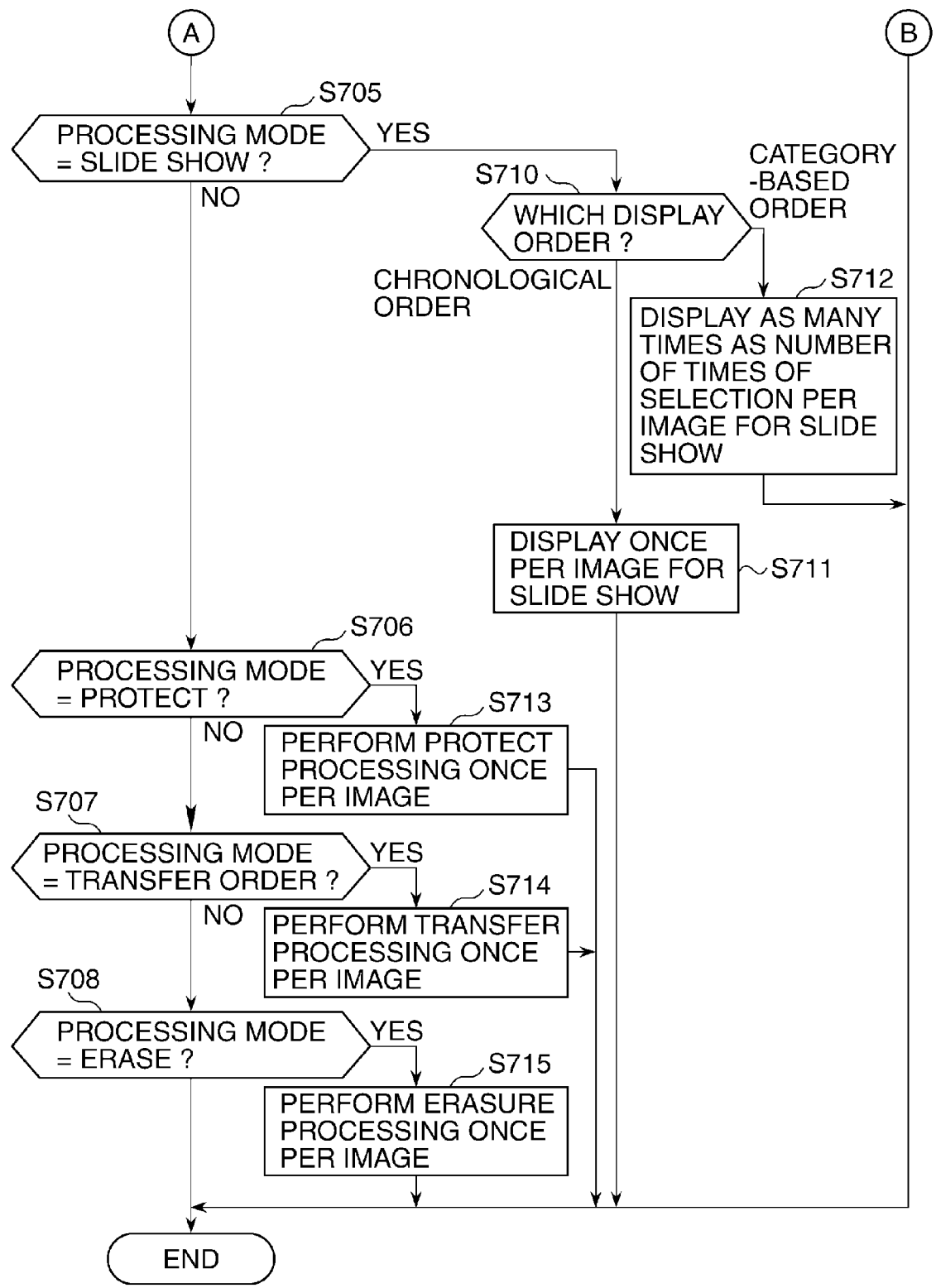

FIGS. 7A and 7B are a flowchart of the processing mode and selection mode-dependent process executed in the step S426 in FIG. 4B. In a step S701, the system controller 50 checks the current selection mode, and determines whether or not the selection mode is "Select by Category". If the selection mode is not "Select by Category", the process proceeds to a step S716, wherein the system controller 50 executes processing according to the selection mode. The processing in this case is performed once on each image data item. On the other hand, if the selection mode is "Select by Category", the process proceeds to a step S702.

In the step S702, the system controller 50 determines whether or not any image data items to which a plurality of pieces of classification information are added exist in the image data groups selected in the selection mode of "Select by Category". If it is determined that no image data items to which a plurality of pieces of classification information are added exist, the process proceeds to the step S716, wherein the system controller 50 executes the processing according to the selection mode. On the other hand, if image data items to which a plurality of pieces of classification information are added exist, the process proceeds to a step S703, wherein the system controller 50 determines whether or not there is any identical image data item selected more than once in the result of selection. If there is no identical image data selected more than once, the process proceeds to the step S716, wherein the system controller 50 executes the processing according to the selection mode. On the other hand, if there is any identical image data selected more than once, the process proceeds to a step S704.

In steps S704 to S708, the system controller 50 determines to which the current processing mode is set, "Print", "Slide Show", "Protect", "Transfer Order", or "Erase". More specifically, in the step S704, the system controller 50 determines whether or not the current processing mode is "Print". If the current processing mode is "Print", the system controller 50 executes printing of the selected image data item, followed by terminating the present process. At this time, each image data item redundantly selected according to more than one piece of classification information is printed as many times as the number of times of selection thereof (step S709). On the other hand, if the current processing mode is not "Print", the process proceeds to the step S705. It should be noted that the step S709 may be executed when the processing mode is e.g. "Index Print" or "Slide Show Playback on Category Basis". An index print is a print of a list of thumbnail images of image data items stored e.g. in a memory card, and is used for the purpose of confirming and selecting images to be actually printed. Further, when printing the image data item redundantly selected according to more than one piece of classification information, an image effect added to the image data item, a frame added to the image data item, an icon associated with the image data item, characters added to the image data item or the like may be made different from the other image data items.

In the step S705, the system controller 50 determines whether or not the processing mode is "Slide Show" in which image data items are automatically sequentially displayed one by one. If the processing mode is "Slide Show", the process proceeds to a step S710, wherein the system controller 50 determines which of a category-based order or a chronological order the current display order is. If the current display order is the category-based order, the process proceeds to a step S712, wherein the system controller 50 displays the slide show in the order of selected categories. At this time, since the display is performed on a category basis, each image data item redundantly selected according to more than one piece of classification information is displayed as many times as the number of times of selection of the image data item. If the display order is the chronological order (i.e. order of timestamps of respective image data items), the process proceeds to a step S711, wherein the system controller 50 performs slide show of the selected image data items in the chronological order according to the settings. At this time, each image data item redundantly selected according to more than one piece of classification information is also displayed once per image data item. On the other hand, the processing mode is not "Slide Show", the process proceeds to the step S706, wherein the system controller 50 determines whether or not the processing mode is "Protect". If the processing mode is "Protect", the process proceeds to a step S713, wherein the system controller 50 performs protect processing once on each image data item. That is, each image data item redundantly selected according to more than one piece of classification information is subjected to protect processing once per image data item. On the other hand, if the processing mode is not "Protect", the process proceeds to a step S707.

In the step S707, the system controller 50 determines whether or not the processing mode is "Transfer Order". If the processing mode is "Transfer Order", the process proceeds to a step S714, wherein the system controller 50 performs transfer processing once on each image data item. That is, each image data item redundantly selected according to more than one piece of classification information is also subjected to transfer processing once. On the other hand, if the processing mode is not "Transfer Order", the process proceeds to the step S708, wherein the system controller 50 determines whether or not the processing mode is "Erase". If the processing mode is "Erase", the process proceeds to a step S715, wherein the system controller 50 performs erasure processing once on each image data item. That is, each image data item redundantly selected according to more than one piece of classification information, is subjected to the erasure processing once. On the other hand, if the processing mode is not "Erase", the process shown in FIGS. 7A and 7B is terminated. It should be noted that the process shown in FIGS. 7A and 7B is also terminated after execution of each of the steps S709, S711, S712, S715, and S716.

FIG. 9 is a diagram showing an example of pieces of classification information (categories) referred to when performing printing. A category 1 is classified as an image to be used as a present for Mr. A, and a category 2 is classified as an image to be used as a present for Mr. B. An image data item IMG_0003 is included in both of the categories (image data groups) and therefore is redundantly sorted.

Figures 10, 11:
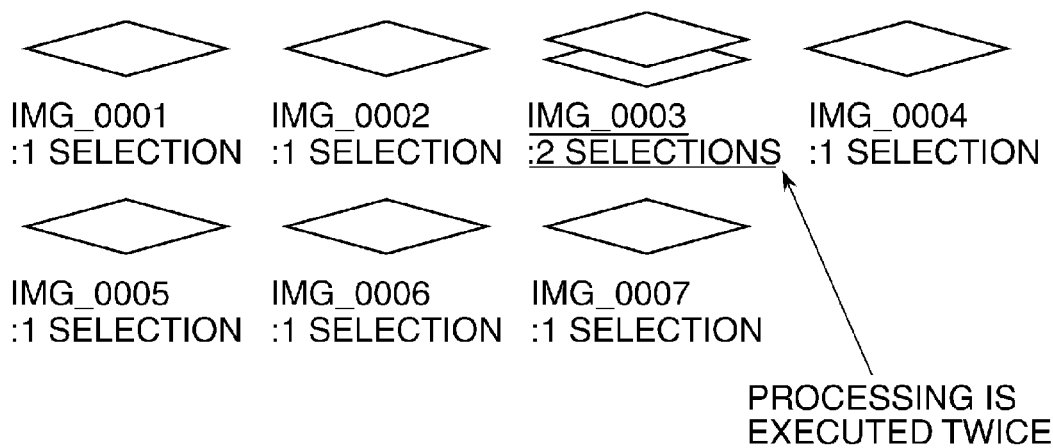
FIG. 10 is a view showing an example of a display on a screen from which image data is selected according to classification information when performing printing.
FIG. 11 is a diagram showing image data items actually printed and the number of times of printing executed on each image data item, when a category 1 and a category 2 are collectively selected as shown in FIG. 10.

FIG. 10 is a view showing an example of a display on a screen from which image data items are selected according to classification information when performing printing, and the illustrated example shows a state where the category 1 and the category 2 are collectively selected. If printing is performed in this state, the image data items designated by the category 1 (present for Mr. A) and the category 2 (present for Mr. B) are printed out. FIG. 11 is a diagram showing image data items and the number of image data items actually printed out in this case. That is, as shown in FIG. 11, the selected image data items IMG_0001 to IMG_0007 are printed. However, as for the image data item IMG_0003 as the redundantly selected image data item, considering that the image data item IMG_0003 is to be given as a present to both Mr. A and Mr. B, it is preferred not to form one print of the image data but to form two prints of the image data item. In the present embodiment, when a plurality of image data groups are collectively selected and then processed in printing, the print processing is performed on the redundantly selected image data as many times as the number of times of selection thereof, and hence the obtained result is suitable for delivery of the prints.

Figure 12:
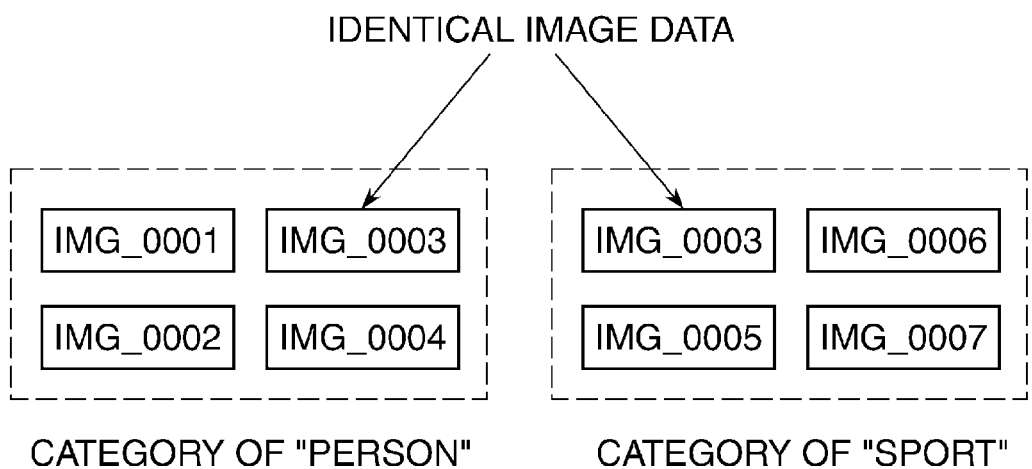
FIG. 12 is a diagram showing an example of pieces of classification information (categories) to be referred to when playing a slide show.

FIG. 12 is a diagram showing an example of pieces of classification information (categories) to be referred to when playing a slide show. Although image data of IMG_0001 to IMG_0007 are sorted into the category of "person" and the category of "sport", the image data item IMG_0003 is included in both of the categories and therefore is redundantly selected. At this time, when displaying the image data item IMG_0003, an image effect added to the image data item, a frame added to the image data item, an icon associated with the image data item, characters added to the image data item or the like may be made different from the other image data items.

Figure 13:
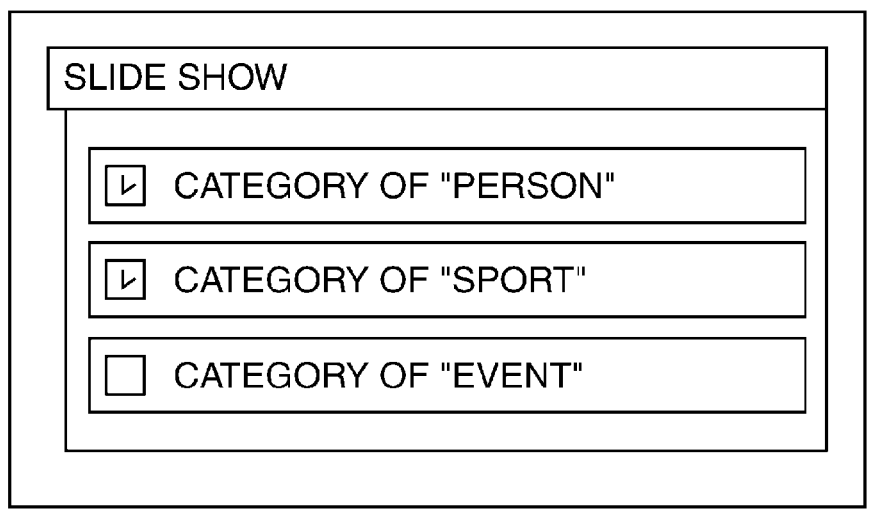
FIG. 13 is a view showing an example of a display on a screen from which image data is selected according to classification information when playing a slide show.

FIG. 13 is a view showing an example of a screen from which image data items are selected according to classification information when playing a slide show, and the illustrated example shows a state where the category of "person" and the category of "sport" are collectively selected. When the slide show is played in this state, a method of displaying image data items is changed according to the setting of the display order as follows.

FIG. 14A shows a slide show played when the display order is set to the chronological order. In a case where it is assumed as in the present embodiment that when an image is picked up, an image data item of the image is automatically stored with a name formed based on a number automatically added thereto, in general, the number is incremented whenever it is added to the name of a new image data item. Therefore, an image data item having a name with a smaller number is an older image data item. As for the illustrated example, it is understood that respective images of the image data items are displayed in an ascending order of numbers of the names of image data items. In this slide show, it is not necessary to perform display processing twice on the image data item IMG_0003 which is redundantly classified in the category of "person" and that of "sport", but only necessary to perform the display processing once. On the other hand, FIG. 14B shows a slide show played when the display order is the category-based order. In this case, first, images are displayed in an ascending order of numbers of the names of image data items belonging to the category of "person", and then, images are displayed in an ascending order of numbers of the names of image data items belonging to the category of "sport". In this case, an image reproduced based on the image data item IMG_0003 belonging to both of the category of "person" and the category of "sport" is displayed twice.

As described above, when playing a slide show, the number of times of processing on each image data item to which a plurality of pieces of classification information are added is changed according to the setting of the display order, whereby it is possible to perform playback display of images in a manner suitable for the purpose. Further, for the slide show playback, there is sometimes provided a function of adding visual effects, such as fade-in/fade-out or wipe, when switching a displayed image for image scrolling. When this function is used, even with the same image data item, it is possible to perform playback display thereof in a manner suitable for respective categories by switching the visual effects between when the image data item is processed for display as one belonging to the category of "person" and when the same is processed for display as one belonging to the category of "sport". Further, the image data item redundantly selected according to more than one piece of classification information may be intentionally not displayed for playback so as to prevent confusion. Further, when a slide show is played, if there is more than one image data item to which a plurality of pieces of classification information are added, the playback (display) time may be changed between the images selected twice and the images selected once in the collectively designated image data groups. For example, the playback time is controlled such that the images selected twice are displayed longer than the images selected once.

Figure 15:
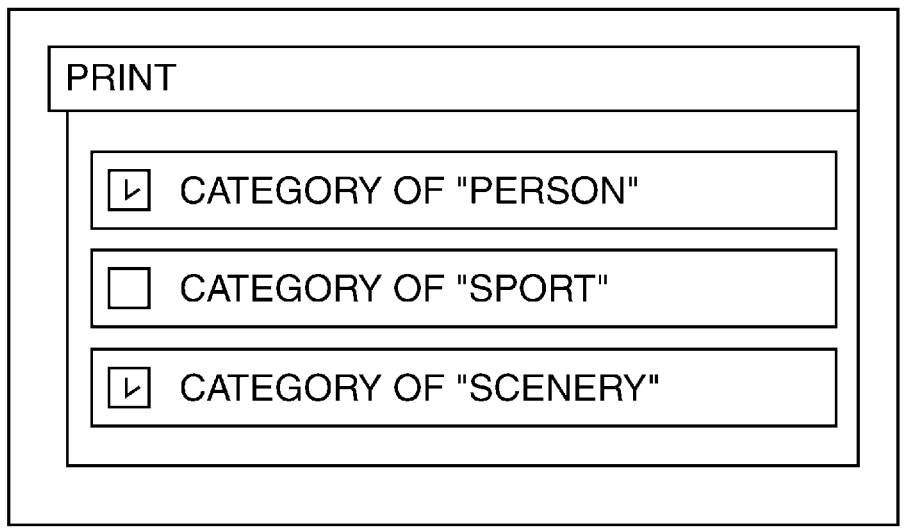
FIG. 15 is a view showing an example of a display on a screen from which image data is selected according to classification information when performing printing.

FIG. 15 is a view showing an example of a display on a screen from which image data items are selected according to classification information when performing printing, and the illustrated example shows a state where the category of "person" and the category of "scenery" are collectively selected. In the illustrated example, it is not intended that the image data items are to be printed and delivered to friends, so that even if an identical image data item redundantly exists in both of the category of "person" and the category of "scenery", it is not necessarily required to form two prints of the image data item. It is understood that the number of times of execution of processing may be changed by taking into account differences in classification information (category), and for example, may be controlled to form only one print of the image data item in this case. Further, the identical image data item may be printed after performing thereon different types of image processing suitable for an image in the category of "person" and an image in the category of "scenery", respectively. For example, by changing parameters, such as contrast, sharpness, and color processing, of an image data item, it is possible to obtain respective prints of the print data item suitable for the different categories.

As described above, when an image data item to which a plurality of pieces of classification information are added is redundantly included in the collectively designated image data groups, processing on the image data item is changed according to the type of the processing, whereby it is possible to perform a processing operation matching the purpose of the processing.

It should be noted that the control by the system controller 50 may be performed by a single hardware unit, or a plurality of hardware units may share processing to control the overall operations of the apparatus. Further, although in the above-described embodiment, the present invention is applied to a digital camera, by way of example, this is not limitative. That is, the present invention can be applied to display control devices used for personal computers, PDAs (Personal Digital Assistants), cellular phone terminals, mobile image viewers, displays provided in printers for selecting and confirming images to be printed, digital photo frames, etc.

The present embodiment is configured such that when a type of processing is selected which is to be performed on a plurality of image data groups formed by respective types of image data items to which respective specific pieces of classification information are added, and if an image data item to which a plurality of pieces of classification information are added is selected more than once as an object to be processed, the processing on the image data item is switched according to the type of processing. Therefore, according to the present embodiment, it is possible, when executing processing on image data groups classified according to classification information, to perform the processing on an image data item having a plurality of pieces of classification information added thereto, in a user-friendly manner adapted to a type of the processing.

Further, it is to be understood that the present invention may also be accomplished by supplying a system or an apparatus with a storage medium in which a program code of software, which realizes the functions of the above described embodiment, is stored, and causing a computer (or CPU or MPU) of the system or apparatus to read out and execute the program code stored in the storage medium.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-021510, filed Feb. 2, 2010, which is hereby incorporated by reference herein in its entirety.

What is claimed is:

1. An image processing apparatus comprising:
a selection unit configured to collectively select a plurality of image data groups;
a designation unit configured to designate processing to be executed on the plurality of image data groups selected by said selection unit; and
a control unit configured to be operable when the plurality of image data groups including a first image data group and a second image data group are selected by said selection unit, to control execution of the processing designated by said designation unit, such that
in the case where the processing designated by said designation unit is one of playback of a slide show in a chronological order, or data transfer to an external apparatus, the designated one of the playback or the data transfer is executed once on both of a first image data item only belonging to the first image data group and a second image data item belonging to at least both of the first image data group and the second image data group, and
in the case where the processing designated by said designation unit is printing, the printing is executed once on the first image data item while being executed on the second image data item sequentially as many times as the number of the image data groups to which the second image data item belongs.

2. The image processing apparatus according to claim 1, wherein when said control unit controls execution of the processing designated by said designation unit on the plurality of image data groups selected by said selection unit, said control unit executes the processing in different manners between the image data item belonging to the at least two image data groups and the other image data items.

3. The image processing apparatus according to claim 2, wherein said control unit controls displaying of the image data item belonging to the at least two image data groups, such that at least one of an image effect added to the image data item, a frame added to the image data item, an icon associated with the image data item, and characters added to the image data item are made different from the other data items.

4. The image processing apparatus according to claim 2, wherein when the processing designated by said designation unit is printing, said control unit controls printing of the image data item belonging to the at least two image data groups, such that at least one of an image effect added to the image data item, a frame added to the image data item, an icon associated with the image data item, and characters added to the image data item are made different from the other data items.

5. The image processing apparatus according to claim 1, wherein said selection unit selects a plurality of image data items to which same classification information is added as items belonging to a same image data group.

6. The image processing apparatus according to claim 1 further comprising a determination unit configured to determine whether or not there exists an image data item belonging to at least two image data groups, among image data items belonging to at least one of the plurality of image data groups selected by said selection unit.

7. A method of controlling an image processing apparatus, comprising:
collectively selecting a plurality of image data groups;
designating processing to be executed on the plurality of image data groups selected by said selection unit; and
controlling, when the plurality of image data groups including a first image data group and a second image data group are selected by said selecting, execution of the processing designated by said designating, such that
in the case where the processing designated by said designating is one of playback of a slide show in a chronological order, or data transfer to an external apparatus, the designated one of the playback or the data transfer is executed once on both of a first image data item only belonging to the first image data group and a second image data item belonging to at least both of the first image data group and the second image data group, and
in the case where the processing designated by said designating is printing, the printing is executed once on the first image data item while being executed on the second image data item sequentially as many times as the number of the image data groups to which the second image data item belongs.

8. A non-transitory computer-readable storage medium storing a computer-executable program for causing a computer to execute a method of controlling an image processing apparatus,
wherein the method comprises:
collectively selecting a plurality of image data groups;
designating processing to be executed on the plurality of image data groups selected by said selection unit; and
controlling, when the plurality of image data groups including a first image data group and a second image data group are selected by said selecting, execution of the processing designated by said designating, such that
in the case where the processing designated by said designating is one of playback of a slide show in a chronological order, or data transfer to an external apparatus, the designated one of the playback or the data transfer is executed once on both of a first image data item only belonging to the first image data group and a second image data item belonging to at least both of the first image data group and the second image data group, and
in the case where the processing designated by said designating is printing, the printing is executed once on the first image data item while being executed on the second image data item sequentially as many times as the number of the image data groups to which the second image data item belongs.

* * * * *